United States Patent [19]

Neglio

[11] Patent Number: 4,626,347
[45] Date of Patent: Dec. 2, 1986

[54] SELF-CLEANING FILTER ADAPTED FOR RAPID, INEXPENSIVE INSTALLATION

[76] Inventor: Thomas P. Neglio, Kings Village Apts. G-98, Budd Lake, N.J. 07828

[21] Appl. No.: 669,673

[22] Filed: Nov. 8, 1984

[51] Int. Cl.⁴ .............................................. B01D 35/04
[52] U.S. Cl. ................................. 210/232; 210/416.4; 210/459
[58] Field of Search ..................... 210/241, 242.1, 232, 210/234, 233, 499, 416.4, 416.5, 459–463

[56] References Cited

U.S. PATENT DOCUMENTS

| | | |
|---|---|---|
| 318,689 | 5/1885 | Breese . |
| 880,240 | 2/1908 | Overhiser . |
| 882,030 | 3/1908 | Traulsen et al. . |
| 1,647,808 | 12/1924 | Neumann . |
| 1,826,170 | 10/1931 | Duggan ............................ 210/242.1 |
| 2,788,125 | 4/1957 | Webb ........................... 210/242.1 X |
| 3,044,957 | 7/1962 | Dow et al. ........................... 210/508 |
| 3,120,491 | 2/1964 | Kincaid ............................ 210/242.1 |
| 3,900,397 | 8/1975 | Bell ................................. 210/460 X |
| 4,003,835 | 1/1977 | Johnson ......................... 210/463 X |
| 4,296,723 | 10/1981 | Aldrich .............................. 123/510 |

Primary Examiner—Tom Wyse
Attorney, Agent, or Firm—Warrick E. Lee, Jr.

[57] ABSTRACT

A filter for liquids contained in a tank having an existing top opening. The inventive apparatus attaches to the top opening. A weight hangs from the attachment means by a cable. A filter floats on the liquid's surface and slides along the cable. The apparatus is adapted for use in two-pipe systems.

8 Claims, 5 Drawing Figures

SELF-CLEANING FILTER ADAPTED FOR RAPID, INEXPENSIVE INSTALLATION

BACKGROUND OF THE INVENTION

The present invention relates to filters for liquids, more particularly for liquids contained in tanks. The inventive filter draws liquid from near the surface, where it is least contaminated. The filter is self-cleaning and will not become fouled on internal pipes in the tank. Most inportantly, the filter of the present invention is inexpensive to construct and can be installed very quickly for a low price. It is especially suitable for installation in home heating oil tanks.

Overhiser (U.S. Pat. No. 880,240) discloses a filter that may be somewhat self-cleaning and will not become fouled on tank internals. However, this filter is far more expensive to make and install than that of the present invention.

Breese (U.S. Pat. No. 318,689) discloses a floating filter that draws liquid from near the surface. However, this filter would tend to become fouled on tank internals. Furthermore, the filter of Breese is not as self-cleaning as that of the present invention.

Neumann (U.S. Pat. No. 1,647,808) and Traulsen et al (U.S. Pat. No. 882,030) disclose floating filters with guide means to prevent fouling. However, these filters are far more complicated to install than those of the present invention and are not as self-cleaning.

The present invention provides a floating filter capable of extremely rapid and inexpensive installation on tanks having an existing opening in their tops. It is especially suitable for home heating oil tanks. Once installed, the filter will not become fouled on internal pipes in the tank and is expected to never require cleaning. This is highly favorable compared to the in-line filters presently in home-heating-oil use, which require cleaning annually or more often.

SUMMARY OF THE INVENTION

The present invention comprises a filter for filtering liquid contained in a tank having an existing top opening comprising:

(a) means for attaching to the top opening, (b) two conduits passing through said attachment means such that, when said attachment means is attached to the opening, each of said conduits has an end inside of the tank and an end outside of the tank, (c) a weight hanging from said attachment means by a cable, said weight being on or near the bottom of the tank when said attachment means are attached to the opening, (d) a float adapted to float on the surface of the liquid and slide along said cable, (e) filtration media attached to said float forming an enclosed space, said filtration media being submerged in the liquid when the float is floating, and (f) two at least partially flexible conduits connecting said enclosed space with the inside ends of said conduits passing through said attachment means, said weight, cable, float, at least partially flexible conduits, and filtration media being capable of passing through the opening in the top of the tank.

DETAILED DESCRIPTION OF THE INVENTION

The inventive filter is designed to be installed through an existing opening on the top of a tank. Most home heating oil tanks have a 2 inch threaded opening on top, and this opening is highly suitable.

Figure 1:
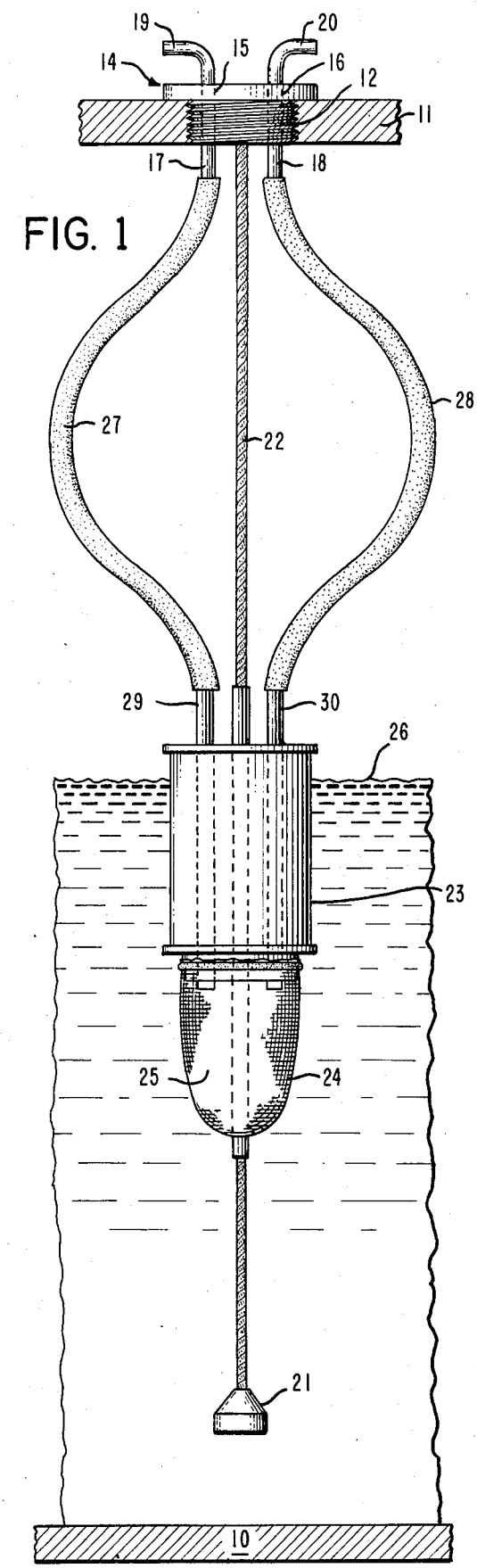
FIG. 1 is a side view of a filter of the present invention installed in a tank.
Figure 3:
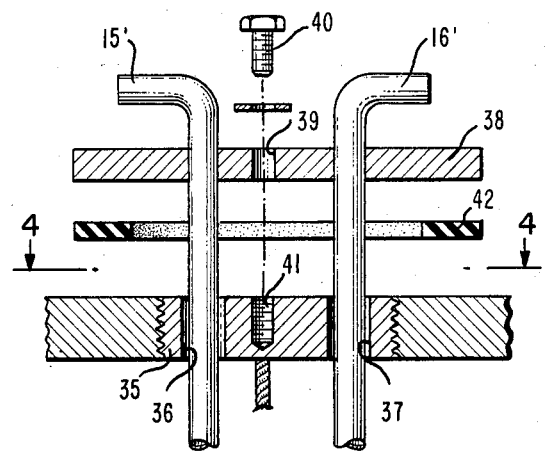
FIG. 3 is an exploded sectional view of preferred means for attaching the filter to a threaded opening in the top of a tank.

FIG. 1 shows the filter installed in a tank. The tank, only partially shown in FIG. 1, has a bottom 10 and a top 11 having opening 12. Means 14 for attaching to the opening are provided. Attachment means 14 may be a simple plug as shown in FIG. 1, or more complicated means as shown in FIG. 3 (described later). Any means suitable for attachment to the opening may be used. Two conduits 15 and 16 pass through attachment means 14 such that each conduit has an end 17 and 18 inside the tank and an end 19 and 20 outside the tank.

A weight 21 hangs from attachment means 14 by cable 22. The cable should be of sufficient length to allow the weight to be on or near the bottom of the tank, but not much longer.

Figure 5:
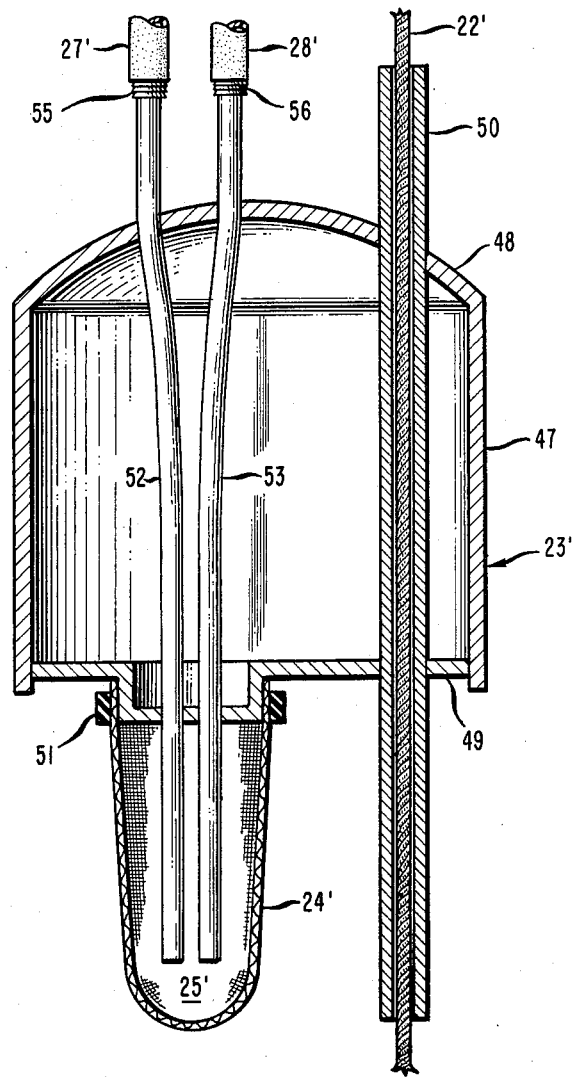
FIG. 5 as sectional view of a preferred float and filter assembly in accordance with the invention.

A float 23 is provided. Float 23 is adapted to float on the surface of the liquid being filtered and to slide along cable 22 as the surface 26 of the liquid in the tank is raised or lowered. Preferred construction for the float is shown in FIG. 5 (described later). Filtration media 24 are attached to float 23 to form enclosed space 25. Enclosed space is space that the liquid in the tank cannot reach without passing through the filter media. The filtration media is positioned such that, when the float floats on surface 26, filtration media 24 is submerged.

Two at least partially flexible conduits 27 and 28 connect enclosed space 25 with inside ends 17 and 18 of conduits 15 and 16 that pass through attachment means 14. Conduits 27 and 28 may be constructed of any flexible material, such as rubber of plastic, compatible with the liquid in the tank. In FIG. 1 conduits 27 and 28 have portions 29 and 30 located in float 23. Portions 29 and 30 do not have to be flexible. The flexible portions of conduits 27 and 28 are of sufficient length to allow float 23 to be disposed near the bottom 10 of the tank when surface 26 is near the bottom.

Figure 2:
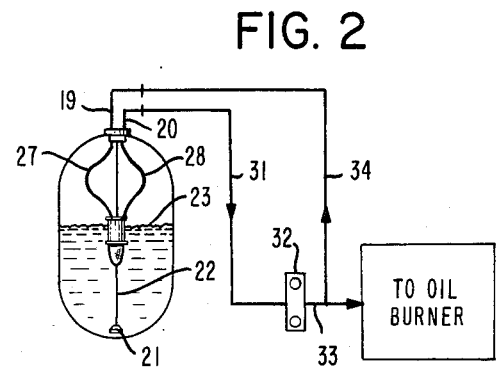
FIG. 2 is a schematic view of a piping system that includes the filter of the present invention.

The filter shown in FIG. 1 is installed as follows. All the installer needs to do is insert weight 21, cable 22, float 23 and filtration media 24 through opening 12, attach attachment means 14 to opening 12, and connect two pipes to outside ends 19 and 20, which may conveniently be adapted for connection to standard pipe fittings. After installation the system will be as schematically illustrated in FIG. 2. Suction pipe 31 runs from one outside end (e.g. 20) to the suction of pump 32. Conduit 33 connects the discharge of pump 32 to the inlet of an oil burner (not shown). In so called "two-pipe systems", commonly used in modern home heating oil service, a return pipe runs from the pump's discharge conduit back to the oil tank. Control means are provided to flow oil back to the tank through the return pipe when the amount of oil pumped exceeds that required by the burner. In FIG. 2 pipe 34 is the return pipe. However, in this case, instead of leading directly to the tank, pipe 34 is connected to another outside end (e.g. 19) of the invention.

The filtration-pumping system operates as follows. When pump 32 is activated, oil flows through filter media 24, into enclosed space 25, through conduit 28, pipe 31, pump 32, pipe 33 into the burner. A portion of the oil flows from pipe 33, through pipe 34, through conduit 27, back into enclosed space 25. This back flowing material causes float 23 to vibrate, in turn causing any particulate matter on filter media 24 to be shaken off. Furthermore the oil returning to float 23 tends to back wash the filter media. This is especially so when pump 32 shuts off. Shortly after shut off there is a brief time when the flow in return pipe 34 exceeds that in pipe 31, causing backward flow through filter media 24, forcably removing any particles from the surface of filter media 24.

When the tank is being filled, turbulance of the rapidly flowing oil causes float 23 to swing like a pendulum on cable 22. This provides a swishing action that removes particles from the outside surface of filter media 24. However, weight 21 does not allow so much movement that the float and flexible conduits become fouled on any internal pipes in the tank. Hence it can be seem that the filter of the present invention is truly self cleaning as a result of vibrations caused by back flow during pumping, back washing upon pump shut-off, and swishing during tank filling.

FIG. 3 shows a preferred embodiment for attachment means when the tank opening is threaded. A threaded plug 35 is screwed into the opening. Plug 35 has two holes 36 and 37. A disk 38 containing two conduits 15' and 16' aligned with holes 36 and 37 is provided, along with means for connecting disk 38 to plug 35. Such means may comprise a threaded hole 41 in plug 35, an unthreaded hole 39 in disk 38 and a bolt 40 capable of passing through hole 39 and screwing into threaded hole 41, thereby tightening disk 38 against plug 35. A gasket 42 may be provided so that the interior of the tank is tightly sealed off from the outside.

Figure 4:
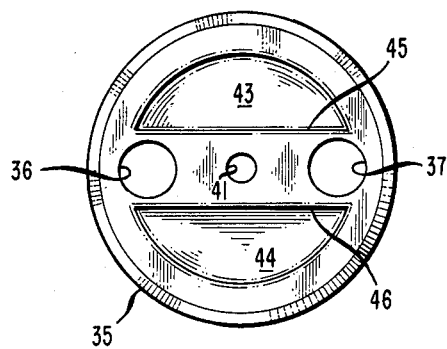
FIG. 4 is a view of a plug of the attachment apparatus of FIG. 3 taken along line 4—4.

Plug 35 may have two "D" shaped holes 43 and 44 (see FIG. 4) which provide flat surfaces 45 and 46 that may be easily gripped by a wrench for installation of plug 35. The arrangement shown in FIG. 3 allows the attachment means to be made very secure without wrinkling gasket 42.

FIG. 5 illustrates a preferred embodiment of a float. The float 23' of FIG. 5 has a liquid-tight member 47 having a top 48 and a bottom 49. Member 47 may be conveniently constructed of a plastic in the shape shown. Rounded top 48 prevents liquid from collecting on the top of the float. A tube 50 passes longitudinally through member 47, and cable 22' passes through tube 50.

Filter media 24' are mounted on the bottom of liquid-tight member 47 in any convenient manner, for example with a collar 51 as shown. Two conduits 52 and 53 pass longitudinally through member 47 from enclosed space 25' to top 48. Each of the conduits has a means 55 and 56 for connecting to the flexible portions 27' and 28' of the conduits leading to attachment means 14. Such connecting means may be simple projections over which the flexible conduits may be slid. For a firmer grip, laboratory type fittings commonly used on Bunsen Burners may be used.

For filtering heating oil, the filter media 24' is preferably a fine-mesh, hydrophobic fabric, such as nylon, capable of passing oil, but excluding particulate matter and water. Suitable filter media are in common use in automobile fuel systems and are described in U.S. Pat. Nos. 4,296,723 and 3,044,957, which are incorporated herein by reference.

EXAMPLE

A filter in accordance with the invention was installed in a home heating oil tank during the heating season. The interior of the tank had never been cleaned. After one week of service, the filter was examined and the filter media was found to be as clean as when it was installed. While the filter was installed, a fuel delivery occurred, but the filter remained intact. On several occasions the filtered oil was examined and found to be free of particulate matter and moisture. Unfiltered oil in the tank was found to contain much particulate matter and water.

What is claimed is:

1. A filter for filtering liquid contained in a tank having a top opening comprising:
   (a) means for attaching to the top opening,
   (b) two conduits passing through said attachment means such that, when said attachment means is attached to the opening, each of said conduits has an end inside of the tank and an end outside of the tank,
   (c) a weight hanging from said attachment means by a cable, said weight being on or near the bottom of the tank when said attachment means are attached to the opening,
   (d) a float adapted to float on the surface of the liquid and slide along said cable,
   (e) filtration media attached to said float forming an enclosed space, said filtration media being submerged in the liquid when the float is floating, and
   (f) two at least partially flexible conduits connecting said enclosed space with the inside ends of said conduits passing through said attachment means,
   said weight, cable, float, at least partially flexible conduits, and filtration media being capable of passing through the opening in the top of the tank.

2. The filter of claim 1 wherein said float and filter media comprise:
   a liquid-tight member having a top and a bottom,
   a tube passing through said liquid-tight member, with said cable passing through said tube,
   filter media mounted on the bottom of said liquid-tight member forming said enclosed space, and
   two conduits passing through said liquid-tight member from said enclosed space to the top of said liquid-tight member, each of said conduits having means for connecting to a flexible conduit.

3. The filter of claim 2 wherein said liquid-tight member is constructed of plastic.

4. The filter of claim 3 adapted for installation on a tank containing fuel oil, wherein said filter media is a fine-mesh, hydrophobic fabric capable of passing oil, but excluding particulate matter and water.

5. The filter of claim 2 wherein said attachment means comprises:
   a plug for insertion into a threaded opening, said plug having two holes,
   a disk containing two conduits aligned with said holes, and
   means for connecting said disk to said plug.

6. The filter of claim 5 adapted for installation on a tank containing fuel oil, wherein said filter media is a fine-mesh, hydrophobic fabric capable of passing oil, but excluding particulate matter and water.

7. The filter of claim 2 adapted for installation on a tank containing fuel oil, wherein said filter media is a fine-mesh, hydrophobic fabric capable of passing oil, but excluding particulate matter and water.

8. The filter of claim 1 adapted for installation on a tank containing fuel oil, wherein said filter media is a fine-mesh, hydrophobic fabric capable of passing oil, but excluding particulate matter and water.

* * * * *